Figure 1:
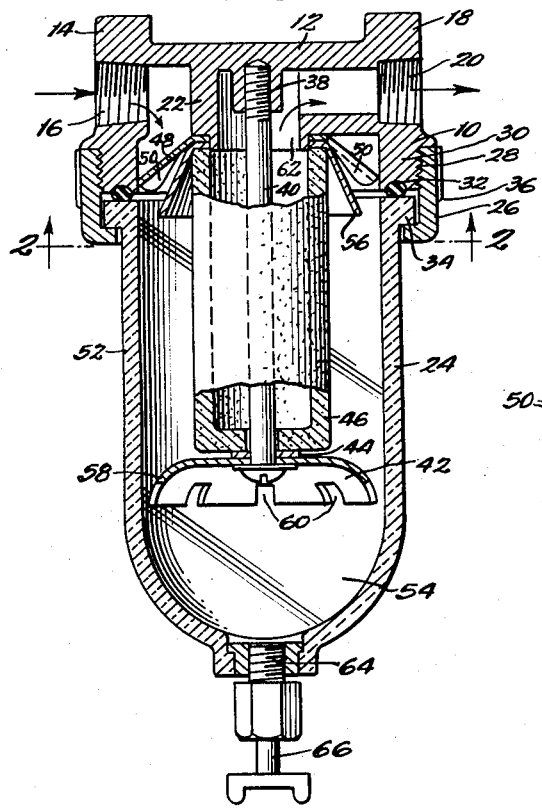

July 14, 1959 E. W. VERES 2,894,600

AIR FILTERING DEVICE

Filed June 1, 1954

INVENTOR:
Edward W. Veres,
BY
Owen, McDougall, Williams & Mende
ATTORNEY

United States Patent Office 2,894,600
Patented July 14, 1959

2,894,600

AIR FILTERING DEVICE

Edward W. Veres, Chicago, Ill., assignor to Arrow Tools, Inc., Chicago, Ill., a corporation of Illinois Application June 1, 1954, Serial No. 433,562

3 Claims. (Cl. 183—67)

This invention relates to a filter for gaseous mediums such as air, etc., and more particularly it relates to a filter adapted to be mounted in an air-supply conduit that delivers operating air to pneumatically actuated tools and the like.

In order to prevent undue harm to and possible destruction of pneumatically operated devices, the air supplied thereto should be filtered to remove moisture and other foreign matter therefrom which might otherwise lodge in such devices. There have been a number of different types of filters on the market and disclosed in the prior patent art, but I have found that they all have one primary disadvantage in that they require excessive cleaning or replacing of the filter element.

The primary reason why the prior art devices require excessive cleaning and replacing of the filter element is that they do not properly direct the flow of air and the accompanying foreign particles and moisture in the air in a manner that maximizes the useful life of the filter element. Additionally, most of these structures do not make provision for the appropriate collection of the foreign particles and moisture. Furthermore, most of the devices are unduly complex in structure which makes them relatively expensive.

This invention overcomes these disadvantages and presents a novel arrangement of elements to achieve the desired result of reducing the frequency of the filter element cleaning and replacement. My invention primarily comprises a receptacle having a head which serves to receive the unfiltered air and an outlet for expressing the filtered air. The air is delivered after admission thereof into the head through a louvered baffle which directs the air towards the wall of the receptacle and also imparts a swirling motion to the air. This centrifugal motion resulting from such direction throws a great deal of the foreign particles and moisture contained in the air against the walls of the receptacle where they are drawn and forced downward to the collection trap. Located below the louvered baffle is a shroud or deflection plate which deflects any foreign particles or moisture, which might otherwise pass through the louvered baffle and into the eddy stream of air, against the wall of the receptacle. A filter element occupies the central portion of the receptacle, and the air passes through the filter element to the outlet of the receptacle into a pneumatic supply line connected thereto. Mounted below the filter element is a second baffle plate of circular configuration in a horizontal plane and which, in a vertical plane, is generally downwardly curved along the outer portion thereof and in particular such curvature is a segment of a circular arc. The purpose of the second baffle plate is primarily to collect moisture which might not be thrown against the sides of the receptacle and to draw off the moisture into the collection trap disposed therebelow where the water and foreign particles can be drained therefrom. The second baffle also serves to isolate the collected moisture and foreign matter from the filter element and thereby prevent it from being thrown up against the filter element by the moving air.

A general object of my invention, therefore, is the provision of a device to effectively filter moisture and foreign matter out of the air delivered through an air-supply conduit and to reduce to a minimum the necessary cleaning and changing of the filter element.

Another object of my invention is to provide means in a filter for directing the input air outwardly towards the wall of the filter receptacle and to impart a swirling motion to the air.

Another object of my invention is to provide a deflection plate in a filter of the character described to direct moisture and foreign matter which might otherwise pass through the air imparting means thereof and into the eddying stream of air towards the wall of the filter receptacle.

Still another object of my invention is to utilize centrifugal force developed by the motion imparted to the air to remove the heavier foreign matter and moisture therefrom, thereby reducing the amount of cleansing and/or changing of the filter element.

Still another object of my invention is the provision of a second baffle or baffle trap in a filter of the type described to pass off remaining moisture into the collection trap and to segregate the collected moisture and foreign particles from the filter element.

Yet, another object of this invention is to provide a filter device comprised of relatively simple parts arranged in a novel manner which can be inexpensively manufactured and assembled.

Figure 2:
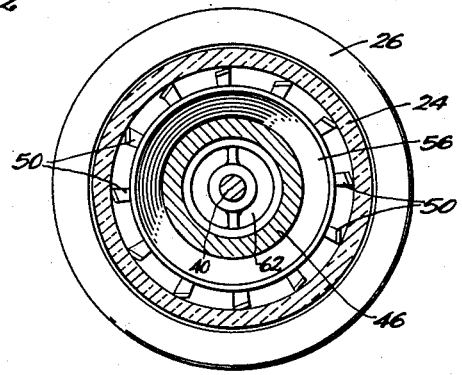

This invention contains additional novel features which make it an improved, inexpensive and practical structure, and such features comprise other objects and advantages of this invention as will hereinafter appear. For purposes of illustration, but not limitation, a preferred embodiment of this invention is shown in the accompanying drawings, in which:

Figure 1 is an elevational view in section showing my new and improved device for filtering air; and Figure 2 is a plan view in section taken on line 2—2 of Figure 1.

The action of the filter has been outlined above. The theory behind the high efficiency of the unit stems from the combined action of a frusto-conical baffle 48 which has a plurality of radial louvers 50 presenting a curved free edge when viewed in frontal elevation. As the air enters the swirl chamber above the louvered baffle 48 it will initially tend to migrate around the baffle 48 in two directions but as the air moves down the conical face of the baffle it will assume a direction dictated by the louvers 50. Since the widest opening between adjacent louvers is near the bottom and outer portion of the frusto-conical baffle, the greatest whirling action of the air will occur at this point in a relatively unidirectional movement of the air mass. Thus the air is directed downwardly, outwardly, and swirlingly. This action cooperates with the inner deflection plate 56 to retard the collection of dirt on the filter unit to further direct the swirling air outwardly and accelerate the velocity of the air at the periphery of the deflecting plate 56 tending to effect an even greater centrifugal separation of fluid and suspended foreign matter.

Referring to the drawings in detail, the numeral 10 generally designates a head or housing having a boss 12 integral with and extending diametrically of the top thereof. One end 14 of the boss 12 is arranged with an opening therein provided with internal screw threads 16 for engagement with a pipe or tube section connected to a source of supply air under pressure (not shown) and such opening constitutes the air-inlet port of the head 10. The opposite end 18 of the boss 12 is also arranged with an opening therein provided with internal screw threads 20 for engagement with a pipe or tube section connected to a pneumatically operated tool or accessory therefor (not shown) and such opening constitutes the air-outlet port of the head 10. The air-inlet port and the air-outlet port are separated by a wall 22 merging with the boss 12 and may be formed integrally therewith, as shown.

A receptacle 24, preferably made of a transparent material such as plastic for purposes of viewing into the interior of the receptacle, is supported by the head 10 by means of a fitting or nut 26 which has a threaded portion 28 mating with screw threads 30 on the head. A sealing gasket 32 is interposed between the surmounting lip 34 of the receptacle and the head 10. The fitting or nut 26 has knurls 36 so that it may be easily gripped for tightening and to unloose the receptacle from the head.

Substantially central of the boss 12 female screw threads 38 are located to threadedly receive a bolt 40. The bolt passes through a baffle trap 42, a washer 44 and a filtering element 46, all of which will be described in greater detail hereinafter.

Securedly interposed between the bottom of the wall 22 and the top of the filter element 46 is the edge of a louvered baffle 48. The louvered baffle 48 is secured around the entire periphery of the top of the filter element 46 and is comprised of a series of vanes 50. The frustoconical louvered baffle 48 is shaped for positioning at an angle of substantially 25 degrees with the horizontal in order to direct air brought in under pressure through the vanes 50 and towards the inner wall 52 of the receptacle 24. The vanes 50 are placed at such an angle as to impart a swirling motion to the air as it leaves the vanes 50 and louvered baffle 48. This gives a centrifugal force to the air causing the heavier foreign particles and moisture to be thrown out against the inner wall 52 of the receptacle 24. As the air is directed downwards by the incoming air, the foreign matter and moisture are forced downwardly along the inner surface of the wall 52 and are collected in a collection trap 54. Of course, gravity also aids in pulling down the foreign particles and moisture along the wall 52 of the receptacle 24.

Also, securedly interposed between the bottom of the wall 22 and the top of the filter element 46 and below the louvered baffle 48 is a shroud or deflection plate 56. As the air is forced through the louvered baffle 48, some of the foreign particles and/or moisture may not be caught in the eddying stream and be thrown thereby against the inner wall 52 of the receptacle 24, and any such moisture and particles will drop through the vanes 50 upon the deflection plate 56 which then directs the droplets of moisture and/or particles into the eddying stream of air.

Thus, by the use of the louvered baffle 48 and the deflection plate 56, the heavier foreign particles and moisture droplets are directed away from direct contact with the filtering element 46 and only the very fine moisture and foreign particles remain in the air and are able to come in contact with the filtering element 46. I have found that this represents only a small portion of the moisture and foreign matter. This, of course, makes it unnecessary to clean or replace the filtering element 46 as often as would otherwise be necessary if substantially all of the foreign particles and moisture in the air were to be collected on the face of the filtering element 46.

As mentioned hereinbefore, a baffle trap 42 is provided below the filtering element 46. The purpose of this baffle is primarily to collect moisture which may be thrown thereupon, or be dropped thereon from the deflection plate, or that may in any other manner be deposited thereon. In order to facilitate the removal of such moisture, the baffle trap 42, in a vertical plane, is curved generally downwardly along the outer portion thereof, as shown at 58, and such curvature is a segment of a circular arc. This permits the forces of gravity to operate most effectively to draw the water downwardly therealong and into the trap 54 disposed therebelow. Additionally, I have provided a plurality of polygonal openings or recesses 60 that are substantially square-shaped in the specific structure. These openings are spaced apart along the bottom or curved marginal edge of the baffle trap 42 to catch the water and to permit it to pass through the baffle plate 42 into the trap 54. I have found that with the eddying effect of the air about the filter element 46, the droplets of water which may collect on the baffle trap 42 will oftentime circle or run around the baffle. By using substantially square-shaped openings 60, the droplets of water will be collected and passed into the trap 54. I have also found that in using moon-shaped or circular openings, the droplets of moisture have a tendency to ride over the top thereof and not be directed into them as is the case with substantially square-shaped openings.

The baffle trap 42 also serves the purpose of segregating the collected foreign matter and moisture in the trap 54 from the air swirling about the filter element 46. As will be noted, the swirling air might possibly throw off some of the foreign matter and moisture against the filter element which, of course, would defeat the purpose of the subject invention. It is also to be noted that the baffle trap 42 and in particular, the curved marginal portion thereof, extends downwardly a short distance along and in spaced relation with the inner wall 52 of the receptacle 24 in order to permit the passage of the foreign matter and moisture into the trap 54.

After the air is passed through the filtering element 46, it is forced out through the passage 62 and out the air-outlet port at the end 18 of the boss 12 which is in open communication therewith, and then may be utilized by suitable pneumatic equipment connected with the outlet port.

After an appropriate amount of the foreign matter and moisture has been collected in the collection trap 54, the water and foreign matter may be discharged therefrom through the drain valve 64 by merely opening the petcock 66, the construction of which is well known in the art.

From the foregoing disclosure, it will be apparent that in use of the filter unit to remove foreign substances from the air supplied under pressure to a pneumatically actuated tool to operate the same, the filter will be interposed in the supply line running from the compressor or other pressure source to such tool. The device will be connected in the line so that the flow of air therethrough is in the direction of the arrows shown in Figure 1. That is to say, air will enter the inlet port defined by the threaded opening 16, and will flow therefrom into the annular chamber provided within the housing and which surrounds the wall 22. Since this annular chamber is in open communication with the interior of the receptacle 24, such air will necessarily flow thereinto through the louvered baffle 48 and over the shroud 56, each of which performs the functions heretofore described. The air will then flow through the porous filter 46 which covers or encloses the mouth of the passage 62; and necessarily then, the air passing through the filter will flow into the passage 62 and outwardly therefrom through the outlet port defined by the threaded opening 20.

Thus it can be seen that I have provided a new and improved type of air filter which employs a louvered baffle to direct the air and its accompanying foreign particles and moisture towards the wall of the receptable as well as to impart a swirling motion to the air in order to permit centrifugal force to remove the heavier foreign particles and moisture. Additionally, I have provided secondary means for deflecting and draining off any foreign matter or moisture which might not be deflected immediately against the wall of the receptacle. By employing these novel means, the number of times necessary to clean the filtering element or to change the filtering element is greatly reduced which, of course, permits more efficient operation of the equipment.

Although I have shown and described a specific embodiment of my invention, I am fully aware that modifications are possible. My invention, therefore, is to be limited only by the spirit of the appended claims as equivalents, obviously, can be substituted within the skill of the mechanic without departing from the principle of the invention.

I claim:

1. In a filter unit, a housing equipped with an elongated receptacle removably secured thereto and depending therefrom, said housing having both an inlet port and a chamber communicating with said inlet port and with the interior of said receptacle, said housing having also both an outlet port and a flow passage communicating with said outlet port and being provided with a mouth communicating with the interior of said receptacle whereby a flow path is defined from said inlet port through said chamber and into said receptacle and outwardly therefrom through said flow passage and to said outlet port, a porous filter secured to said housing in covering relation with the mouth of said passage and extending downwardly therefrom into said receptacle, a baffle trap mounted within said receptacle and extending transversely thereacross adjacent the lower end of said porous filter, said baffle trap having an arcuate outer portion curved downwardly toward the bottom of said receptacle in spaced relation with the side walls thereof and having also a plurality of spaced openings in the curved portion thereof, an outwardly and downwardly inclined baffle extending across said chamber between said inlet port and receptacle and having a plurality of louver-equipped openings thereabout to enforce a fluid flow into said receptacle of turbulent character and in a direction toward the side walls thereof, and a downwardly and outwardly inclined deflection baffle overhanging said porous filter and underlying said inclined baffle, said deflection baffle having a greater angle of inclination than that of said inclined baffle and terminating at its lower end in spaced adjacency with the side walls of said receptacle to further direct the fluid flow thereagainst at an increased velocity.

2. The filter unit of claim 1, in which each of said openings is of polygonal configuration.

3. The filter unit of claim 1, in which the aforesaid downwardly curved outer portion of said baffle trap lies along the arc of a circle.

References Cited in the file of this patent

UNITED STATES PATENTS

| | | |
|---|---|---|
| 630,023 | Baker | Aug. 1, 1899 |
| 1,702,804 | Winslow | Feb. 19, 1929 |
| 1,854,010 | Woodford | Apr. 12, 1932 |
| 1,981,549 | Hawley | Nov. 20, 1934 |
| 2,467,408 | Semon | Apr. 19, 1949 |
| 2,692,655 | Peeps | Oct. 26, 1954 |
| 2,709,524 | Russell et al. | May 31, 1955 |
| 2,720,278 | Wiley | Oct. 11, 1955 |

FOREIGN PATENTS

| | | |
|---|---|---|
| 293,945 | Germany | Sept. 6, 1916 |
| 652,931 | Great Britain | May 2, 1951 |